S. SYKES.

Assignor, by mesne assignments, to M. GARLAND.

Sawdust Feeder for Furnaces.

No. 9,692. Reissued May 3, 1881.

WITNESSES=
E. Wolff.
J. Felber.

INVENTOR=
S. Sykes.
E. B. Mitchell
Atty
J. N. McPherson

UNITED STATES PATENT OFFICE.

SAMUEL SYKES, OF CHIPPEWA FALLS, WISCONSIN, ASSIGNOR, BY MESNE ASSIGNMENTS, TO MICHAEL GARLAND.

SAWDUST-FEEDER FOR FURNACES.

SPECIFICATION forming part of Reissued Letters Patent No. 9,692, dated May 3, 1881.

Original No. 91,384, dated June 15, 1869. Application for reissue filed March 29, 1881.

*To all whom it may concern:*

Be it known that I, SAMUEL SYKES, of Chippewa Falls, in the county of Chippewa and State of Wisconsin, have invented a new and Improved Sawdust-Firing Device; and I do hereby declare that the following is a full, clear, and exact description thereof, which will enable those skilled in the art to make and use the same, reference being had to the accompanying drawings, forming part of this specification.

My invention relates to that sort of contrivances for feeding sawdust to a furnace in which the fuel is supplied to the fire-chamber without the necessity of opening the furnace-doors, and has for its main object to provide a simple and efficient means for not only thus effecting the supply of fuel to the furnace, but for also effecting a thorough distribution or spreading of the sawdust over the surface of the grate-bar while being fed into the fire-chamber of the furnace.

To these ends and objects my invention consists in the employment, in combination with the furnace for heating one or more boilers, of a hopper or hoppers so constructed and arranged partially within the fire-chamber of the furnace as to supply the sawdust, as may be required, and in the manner hereinafter more fully described, directly to the grate-bars; and my invention further consists in the employment, in combination with a hopper-like receptacle, and adapted to contain and to discharge into the fire-chamber the contained sawdust, of a shelf-like device adapted to receive the fuel discharged from the lower end of the hopper, and a spreader device or fly mounted to rotate in about a horizontal plane immediately over said shelf-like device, and adapted to throw off (or fly) the sawdust from said shelf and thoroughly distribute it over the surface of the grate or fire-bed, as will be hereinafter more fully explained.

Figure 2:
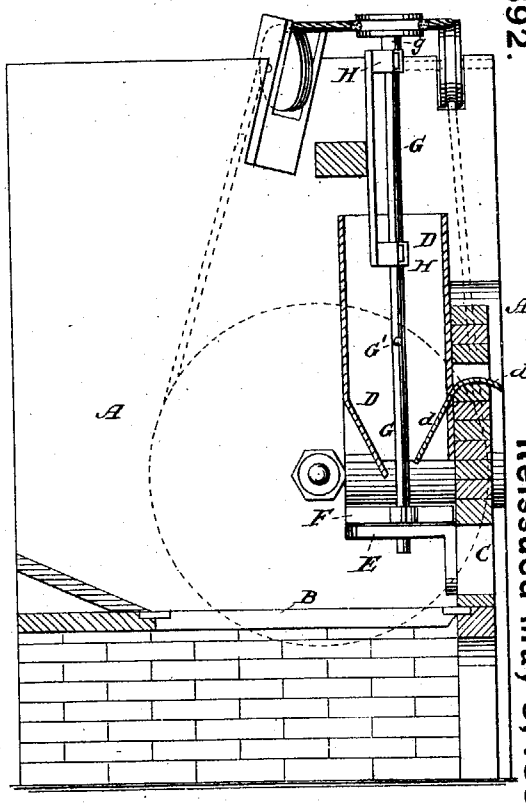
Figure 3:
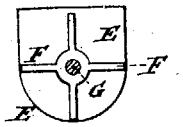
Figure 1:
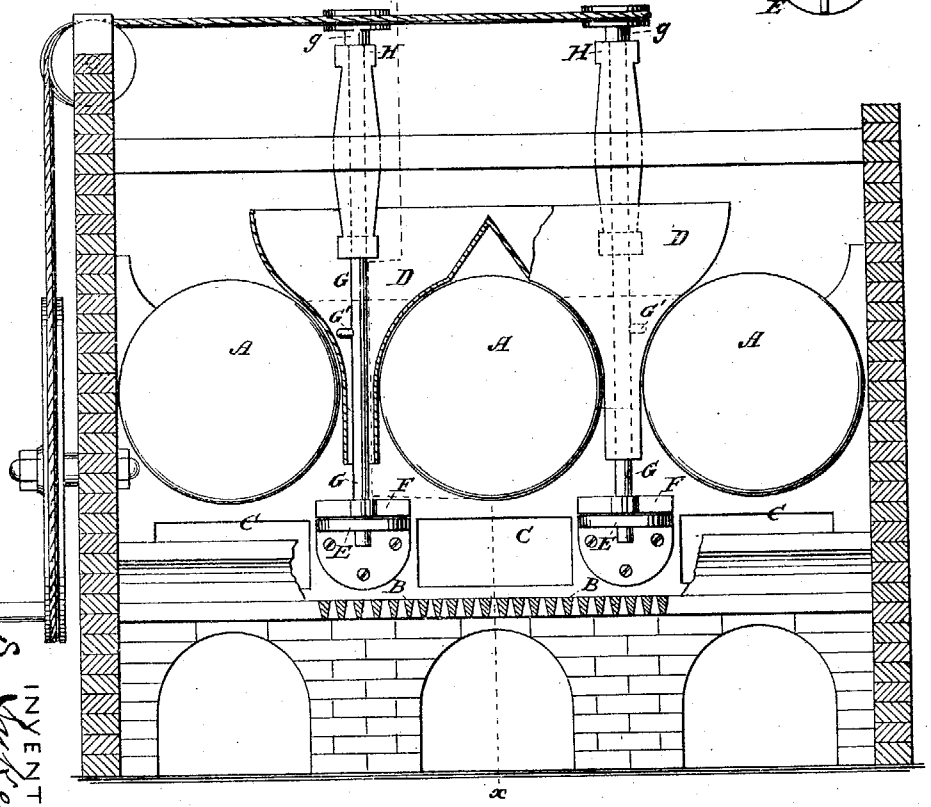

In the accompanying drawings, Figure 1 is a back view of a furnace and nest of boilers having my improvements applied thereto. Fig. 2 is a transverse section of the contrivance, taken at the planes indicated by the dotted line *x x* at Fig. 1; and Fig. 3 is a detail view of the shelf-like device and the spreader detached and shown in top view, to more clearly show than either of the other figures the contour of the shelf and the arrangement therewith of the spreader or fly.

In the several figures the same part will be found designated by the same letter of reference.

A A A are three boilers, mounted or set in a well-known manner in the usual arches or brick-work, as shown.

B represents the grate or grate-bars of the furnace, and C C C the furnace-doors.

D is a hopper, into the upper larger portion or mouth of which the fuel is put, and from the lower throat-like and smaller end of which it is fed to the furnace, in a manner to be presently explained.

E is a sort of shelf or bracket like device bolted to the front wall of the furnace, and located, as shown, about centrally beneath and a short distance below the lower end (or feeding-orifice) of the hopper D. This shelf E has a vertical central perforation in it for the accommodation, as shown, of the lower end of the vertical shaft G, which carries the fly F, and which is suspended from and freely rotates at its upper end in the upper journal-box, H, of a suitable bearer or stand. The object of thus supporting the said shaft G by means of its collar *g* resting on top of its upper journal-box, H, is to prevent the fly F, secured to said shaft near its lower end, from touching the upper surface of shelf E, and thus interfering with the free rotation of said fly over and in close proximity to the top surface of said shelf. Said shaft G is provided with an agitator or stirring device, G′, and is designed to be rotated by any suitable means.

As the hoppers and the devices combined with each are duplicates, the foregoing descriptions answer for all the hoppers and their attachments.

In the drawings the means shown for turning the shafts G consist of pulleys secured to their upper ends, and provided with a band passed round about said pulleys, as illustrated, and carried thence to a driving-wheel at one side of the furnace, which wheel may be driven in any desired manner.

Each hopper is provided with a sort of sliding door or valve, *d*, which forms, as it were, one side of the lower portion of the hopper, and by means of which the discharge of the contents of the hopper may be controlled or regulated. As the throats of the hoppers extend down into the furnace, are located over the grate-bars, as shown, and are between the boilers, an opportunity is thus afforded for drying the fuel contents of the hoppers before it may be discharged onto the fire.

The general mode of operation of my improved feeder contrivance needs but brief explanation, in view of the foregoing description and what the drawings clearly indicate.

The hoppers D being properly supplied with the sawdust, their contents are permitted to escape from their lower ends as the fuel may be needed, the supply to the furnace being regulated at the vicinity of each hopper by a suitable manipulation of the door or slide *d* of each. Any clogging or tendency toward clogging in the narrow throat-like portion of the hopper will be overcome by the rotatory agitators, and the feed or discharge of the sawdust is regulated by the engineer through the medium of the doors *d*, so as to have the requisite or desired amount of fuel fed to the different parts of the furnace. As the sawdust discharges from the lower end of the hopper D it falls onto the shelf E and the fly mounted over said shelf, and as the radial wings or arms of the fly F are rotated by the turning of shaft G, they spread or scatter (by their centrifugal action thereon) the fuel horizontally and send it in a sort of sprayed condition over the surface of the fire-bed, whereby a most desirable mode of application of the fine or dust-like fuel is effected.

Having so fully described my improved contrivance that those skilled in the art to which my invention appertains can readily understand and practice the latter, what I claim as new, and desire to secure by Letters Patent, is—

1. The combination, with a steam-boiler furnace, of hopper-like fuel-receptacles, the lower feeding ends of which are located within the fire-chamber and between the boilers, and which are adapted to discharge the sawdust properly, and in such quantity as may be desired, onto the fire-bed, all substantially as set forth.

2. In combination with a boiler-furnace and a hopper-like receptacle having its lower feeding end located within the fire-chamber, a distributer or spreader composed, essentially, of a shelf and a rotating fly, the combination being such, as described, that the sawdust discharged from the hopper is scattered horizontally over the fire-bed, as set forth.

In testimony whereof I have hereunto set my hand this 28th day of February, 1881.

SAMUEL SYKES.

In presence of—
R. C. BIERCE,
MARY D. BIERCE.